United States Patent [19]
Finn

[11] Patent Number: 5,430,861
[45] Date of Patent: Jul. 4, 1995

[54] COMPUTER USING OPTICALLY ENCODED VIRTUAL MEMORY

[76] Inventor: Charles Finn, 26762 SW. 124 Ct., Miami, Fla. 33032

[21] Appl. No.: 104,241

[22] Filed: Aug. 9, 1993

Related U.S. Application Data

[63] Continuation of Ser. No. 692,216, Apr. 26, 1991, abandoned, which is a continuation-in-part of Ser. No. 680,477, Dec. 11, 1984, Pat. No. 5,012,407.

[51] Int. Cl.$^6$ .................... G11B 17/00; G11B 17/22; G06F 3/00
[52] U.S. Cl. .................. 395/425; 360/97.01; 360/105; 360/106; 360/109; 369/252; 364/248.1; 364/952.1; 364/236.2; 364/952.31
[58] Field of Search ............... 364/200, 900; 395/425 MS; 360/97.01, 105, 106, 109; 369/252

[56] References Cited

U.S. PATENT DOCUMENTS

| | | | |
|---|---|---|---|
| 4,298,932 | 11/1981 | Sams | 364/200 |
| 4,310,883 | 1/1982 | Clifton et al. | 364/200 |
| 4,342,110 | 7/1982 | Kitamura et al. | 369/252 |
| 4,653,021 | 3/1987 | Takagi | 364/900 |
| 4,941,125 | 7/1990 | Boyne | 364/900 |
| 5,012,407 | 4/1991 | Finn | 364/200 |

OTHER PUBLICATIONS

Dictionary of Computers Information Processing and Telecommunications 2nd ed Jerry Rosenberg ©1984 J. Wiley & Sons p. 692.

*Primary Examiner*—Joseph L. Dixon
*Assistant Examiner*—B. James Peikari
*Attorney, Agent, or Firm*—Patula & Associates

[57] ABSTRACT

A method of and apparatus for extending the memory capacity of a computer system having a rotating optical memory storage device and a fixed memory storage includes a scanner for accessing computer information and a rotating optical read-write memory device for storing computer information and for accessing and transferring computer information to and from the scanner and to and from the discrete memory storage of the computer system. The method includes the steps of storing computer information on a scannable storage medium, accessing computer information from the scannable storage medium, and transferring the computer information to the scannable storage medium or discrete memory storage of the computer system through the use of a multi-head rotating optical memory device. The scanner uses an optical laser scanning system to encode computer information on a physical medium. The rotating optical memory device uses virtual memory techniques to store and retrieve data for use at a required time.

10 Claims, 9 Drawing Sheets

FIG-9

COMPUTER USING OPTICALLY ENCODED VIRTUAL MEMORY

This is a continuation of application Ser. No. 07/692,216, filed Apr. 26, 1991, now abandoned, which was a continuation-in-part of application Ser. No. 06/680,477, filed Dec. 11, 1984, now U.S. Pat. No. 5,012,407, issued Apr. 30, 1991.

TECHNICAL FIELD OF THE INVENTION

The present invention relates generally to computer systems and, more particularly, to small portable computer systems with memory systems that include a virtual storage mode with optically scanned media. The memory systems show an increased capacity and reduced response time in comparison with conventional memory storage as a result of the use of optical media and multiple scanning heads to read from and write to the optically scanned media.

BACKGROUND OF THE INVENTION

Portable data carriers with microprocessor control are well known. One such device is disclosed in U.S. Pat. No. 4,211,914, to Drexler, issued Aug. 8, 1980. This patent discloses a secure data storage system using both magnetic and optically encoded data on a card. The data storage system of the '914 patent illustrates the use of a microprocessor and read-only memory (ROM) to evaluate the character of the data after a data transaction. The data storage system of the '914 patent is particularly directed to error recognition in data which is to be stored, unlike the present invention, which utilizes an optically scanned memory to increase the data capacity of discrete memory devices of a computer system and to decrease the response time of the system. The memory capacity and response time of a computer system are improved in the present invention by juxtaposing a semiconductor or other discrete memory device and a rotating optical medium with multiple read-write heads, operating in a virtual-page mode to replace or extend the discrete memory.

In addition, data cards for retention or revision of data in a remote-data acquisition system are also known. One such data card is disclosed in U.S. Pat. No. 3,978,320 to McBride Jr., in which a card readable by a magnetic card reader is used to display and update inventory data. Unlike the present invention, which uses an optical laser scanner, the '320 patent teaches an electromagnetic data accessing system that includes a magnetic card reader and card-holding matrix to access data. The data card of the '320 patent does not use a data storage function to replace or extend the capacity of discrete memory devices of a computer system as does the present invention. In addition, the apparatus of the '320 patent does not decrease the response time of the computer system, as does the present invention.

Several known systems for laser optical encoding on plates or strips of optical media have been presented in the general field of memory-recording media. The read-write laser optical card system and related technology utilized in the present invention is well known in the art, as exemplified by U.S. Pat. No. 4,360,728, to Drexler, entitled "Banking Card for Automatic Teller Machines and the Like," and U.S. Pat. No. 4,314,260, also to Drexler, entitled "Laser Pyrographic Reflective Recording Layer in a Carbon Containing Absorptive Matrix." The '728 patent discloses a data card with a pair of spaced information records. One record is a strip of high-resolution reflective laser recording material. The other information record is of a magnetic recording material. An external card reader is needed to examine data on the information records or strips and to make additions to the "read-after-write" laser strip contained on the card. The reflective laser recording material is perforated by the laser in order to encode data on the card and to allow the read head assembly to read the data from the card. This external card must be introduced into a remote card reader-writer to verify, modify or reject data already on the card. This invention is particularly applicable to user-card identification applications.

The Drexler '260 patent discloses a laser pyrographic reflective recording layer using a rotating disk for fast random access to the information stored on the layer. The '260 patent also discloses the use of stacked plates for intermediate-speed random access by means of an electro-optical scanner.

The present invention uses the advantages of the laser pyrographic reflective recording layer as disclosed in the Drexler '260 patent to provide a very high-density data medium coupled with a remote data-card storage system. The optically encoded memory system is an extension of the random-access memory (RAM) of a computer system in its ability to write and read computer information rapidly to and from the data card. Further, the memory system of the present invention extends the capacity of the discrete RAM of the computer without changing its characteristics as viewed by a user. An optical laser scanner coupled with virtual memory techniques and hardware, as used in the present invention, provides rapid data searching, resembling the operation of true read-write semiconductor RAMs.

Semiconductor RAMs have not previously been compatible with some multiple-processor architectures, particularly hand-held portable architectures, because of limitations on the available physical space. Previously, serial configurations in memory systems caused relatively long wait states while writing to or reading from the read-write optical laser memory. This occurred when the required computer information was not available in the bit slice processor of the cache memory at the required time because the desired computer information was at the extremities of the optical strip, or in other words the farthest geographic location from the nominal position of the optical reader.

The present invention increases the read-write speed of a computer system by including virtual memory operation and having a bit slice processor which is in communication with a main processor by means of a processor bus and an input-output bus. Such a configuration significantly accelerates the retrieval time of the system, making computer information available for use by the main processor in a timely fashion. Use of an optical laser scanned medium with virtual memory operation is a significant improvement in the area of available "on-board" active memory space, providing reduced physical size of the system while decreasing the accessing time of such a system. Moreover, the use of a multiple-processor architecture, in combination with this type of memory medium, brings large-scale performance to moderate size geometries and price structures in a way that was previously unavailable in the computer market.

SUMMARY OF THE INVENTION

The present invention uses virtual memory storage techniques coupled with an optical laser scanned medium to increase the capacity of discrete hardware memory storage of a computer system by replacing or extending the memory storage. Computer information, which may be data, program, or control information, is encoded optically through the use of processor-controlled laser read-write head assemblies onto a physical medium. The apparatus of the present invention includes a scanner assembly for accessing computer information and a memory device for storing computer information. This configuration provides the ability to access and transfer the computer information rapidly to and from the scanner assembly, as well as to and from the discrete memory storage associated with the computer system. This configuration thereby extends the memory capacity of the computer system while reducing the access and retrieval time necessary to manipulate computer information. The scanner assembly has multiple heads, which reduces access time to recover data from the scanned medium. Further, the present invention also includes a processor in communication with the scanner and the memory storage device for rapidly and efficiently processing and controlling the computer information.

The preferred embodiment of the present invention that is shown here also includes a host or main processor for processing computer information, a data entry device or keyboard for entering computer information, a display device for displaying computer information, a memory device that functions as an operating memory and as temporary storage memory, a laser-encoded card for storing computer information and a laser-driven card reader-writer for reading and writing computer information to and from the laser-encoded card. These individual elements are in communication with and controlled by the main processor through a bus system which connects them.

In operation, the present invention extends the memory capacity of a computer system by storing the computer information on a rapidly scannable storage medium. The computer information is accessed from the scannable storage medium and is transferred to the discrete memory storage of the computer system through use of the memory system of the present invention.

In the preferred embodiment of the memory enhancing system, the operative steps of the present invention are controlled by the computer for expedient and efficient transfer of computer information. The computer information is retrieved from the optically scanned medium and is transferred to a cache memory by a bit-slice processor. The main processor scans an input-output bus for a user input command. The discrete memory storage is then scanned for an operating system command corresponding to an input command from the user. The optically scanned medium is scanned for handling instructions corresponding to the operating systems command. The corresponding handling command is then retrieved and transmitted to and from the discrete memory storage device, providing rapid access to and transfer of the computer information.

The memory-enhancing device of the present invention provides a relatively large memory storage capacity compared to the relative size of the volatile memory store that is included in the basic architecture of a computer system. This enlarged memory capacity is attainable through the use of a laser-encoded optical medium in combination with virtual memory techniques. Optical media may be configured as strips, cards, or data pages, each having increasingly larger data capacity volumes. Further, the use of a laser-encoded optical medium provides increased integrity of computer information since such a medium is not affected by magnetic fields or surface wear and can retain its information content in high-temperature environments.

The memory-increasing apparatus of the present invention allows the application of optical-laser memory to a wide variety of computational architectures and geometries. Up to the present time, use of an optical medium as memory storage for a computer system has generally been limited to disk-driven geometries or to data cards which are implanted with optical-medium strips. Both of these configurations are outside the central processing unit and its associated bus. By including the optical memory in the extended bus portion of the architecture and putting the optical scanner relatively close to the main processor chip and the memory-processor bus hardware, the physical size of the system is reduced. Such size reduction allows the computer system to be housed in a small hand held or palm-held package that is readily portable.

In addition, the present invention provides a large amount of versatile RAM storage that complements the discrete-memory capacities of an "on-board" computer configuration. "On board" is taken to mean included within or inside the confines of the external housing of the unit containing the main processor. The invention can be utilized in hand-held, lap-top, desk-top, or mainframe configurations, thereby providing a versatile, compact, inexpensive memory enhancement for a variety of computer systems.

Other advantages and features of the present invention will become apparent from the following detailed description of the preferred embodiment of the invention, from the claims, and from the accompanying drawings.

DETAILED DESCRIPTION OF THE INVENTION

Single-processor, distributed-processing, or pipeline computer architectures can all be reduced in memory size and increased in data-storage capacities by the use of virtual memory techniques with very high data-density memory media. A virtual memory configurtion is a well-known way of extending the capacity of the main memory or discrete memory of a computer. Virtual memory is defined here as a memory placed in parallel with a volatile memory and operated so as to appear to be part of the volatile memory. One system for enlarging a computer memory over and above its volatile memory capacity is called disk random-access memory (disk RAM). Disk RAM is a conventional memory component that is accessed through a bus network by a main processor. Disk RAM provides storage features like those of conventional disk-memory storage, while decreasing the time needed to access computer information. Accordingly, disk RAM provides memory storage which reacts like conventional discrete semiconductor RAM, while reducing the number of components and the physical size of the memory device.

It should be understood that the term computer information as used here includes a number of information signals that may be used by a computer system. Such information signals include, but are not limited to, program instructions and data elements.

Expansion of the memory of a computer by virtual-memory techniques is accomplished in the present invention by interposing a disk RAM between the main processor and main memory of a computer system that operates in a bus configuration. Special accessing methods are implemented in the addressing scheme to provide rapid access to the computer information stored in the disk RAM and the main memory of the system when required. Virtual memory techniques which utilize special addressing schemes allow computer information to be accessed easily and rapidly while requiring only a minimal amount of additional hardware. The additional hardware needed to store and retrieve computer information by virtual memory techniques is generally a main processor and an associated bit slice processor having a cache memory.

A high-density disk RAM includes, but is not limited to, a pyrographic layer that is affixed to a physical medium such as a card, rotating disc, or the like and that is adapted to be read into and from by an optical laser having the ability to generate both read and write levels of intensity. The pyrographic layer or optical laser medium may be in the form of a strip affixed to the surface of a wallet-sized card with a length equal to or exceeding its width, and may be expanded to cover almost the entire surface of the card. However, it should be understood that the size of the optical laser medium may vary greatly from a very thin strip to a full page containing as much as one half of a gigabyte of computer information or more, as long as the information is divided into convenient data blocks.

The optical laser medium is scanned by a low power optical laser scanner while the medium is mechanically positioned to be read by the reading laser head so as to access computer information stored on the medium. Computer information written to or retrieved from the laser medium is then transferred by the bit slice processor through a processor-memory bus to the RAM. The advantages of the memory enhancing system of the present invention, including an optical medium coupled with the features of a disk RAM, are the rapid read-write and scanning rates of the low-power laser scanner, the ability to reduce the size of the data storage medium, and the ability to package the low-power laser scanner and the disk RAM in an enclosure having small physical dimensions.

Generally, computer information is accessed from an optically scanned medium by an optical laser scanner. A display is provided for a user to view operation of the system. A data-entry device is provided to enter computer information comprising data or program instructions or both. A virtual memory stores computer information which allows subsequent access to and transfer of the computer information to and from the optical laser scanner and to and from discrete memory storage devices in the system rapidly. A main processor is also provided for processing computer information by transferring data information from the data entry device, the scanner, and from associated peripheral devices to one or more of the discrete memory devices through the use of a processor bus system and an input-output bus system. The virtual memory transfers the computer information from the optically scanned medium through the processor bus to the discrete storage devices of the system.

Figure 1:
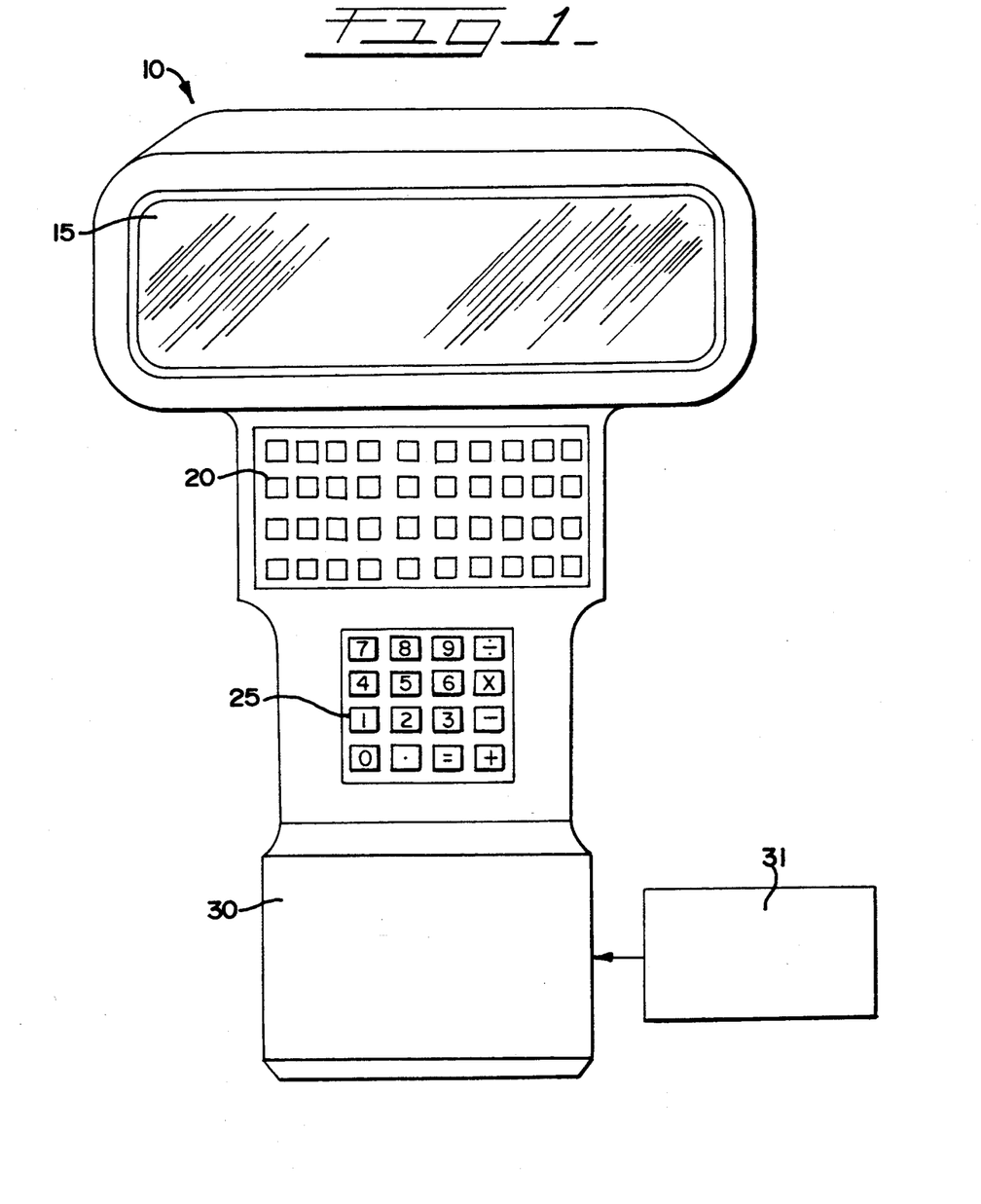
FIG. 1 is a front perspective view of a portable hand-held computer embodying the optically encoded memory system of the present invention.

FIG. 1 is a front perspective view of a portable hand-held unit 10 embodying the optically encoded memory system of the present invention. The hand-held unit 10 includes a display 15 which allows system prompts, data, program instructions, or any other information to be communicated from the system to the user. It should be understood that the display 15 may include, but is not limited to, a liquid crystal display, a light-emitting-diode (LED) display, or the like. The hand-held unit 10 also includes a data entry device, illustrated here as a standard ASCII keyboard 20. The keyboard 20 allows a user to communicate computer information to the system and is here located directly below the display 15 for ease of operation.

A standard dual tone-multiple frequency (DTMF) telephone key pad 25 that is located directly below the keyboard 20 provides for an interface of the unit 10 with a telephone system. Such a telephone interface allows the unit 10 to communicate with other units and other computers if desired. The hand-held unit 10 further includes an optical laser card reader 30 which is located directly below the touch-tone key pad 25 and which allows computer information to be accessed to and from an optically laser encoded card, such as a card 31 that is illustrated in FIG. 1. The card 31 may be either a linear optical medium or a rotating optical medium. It should be understood that, while the hand-held unit 10 is illustrated here, the computer system embodying the optically encoded memory system of the present invention can take on a variety of physical appearances. Such physical appearances may include, but are not limited to, small hand-held units, intermediate-sized portable and fixed computer systems and large stationary multiple-user main-frame computer systems.

Figure 2:
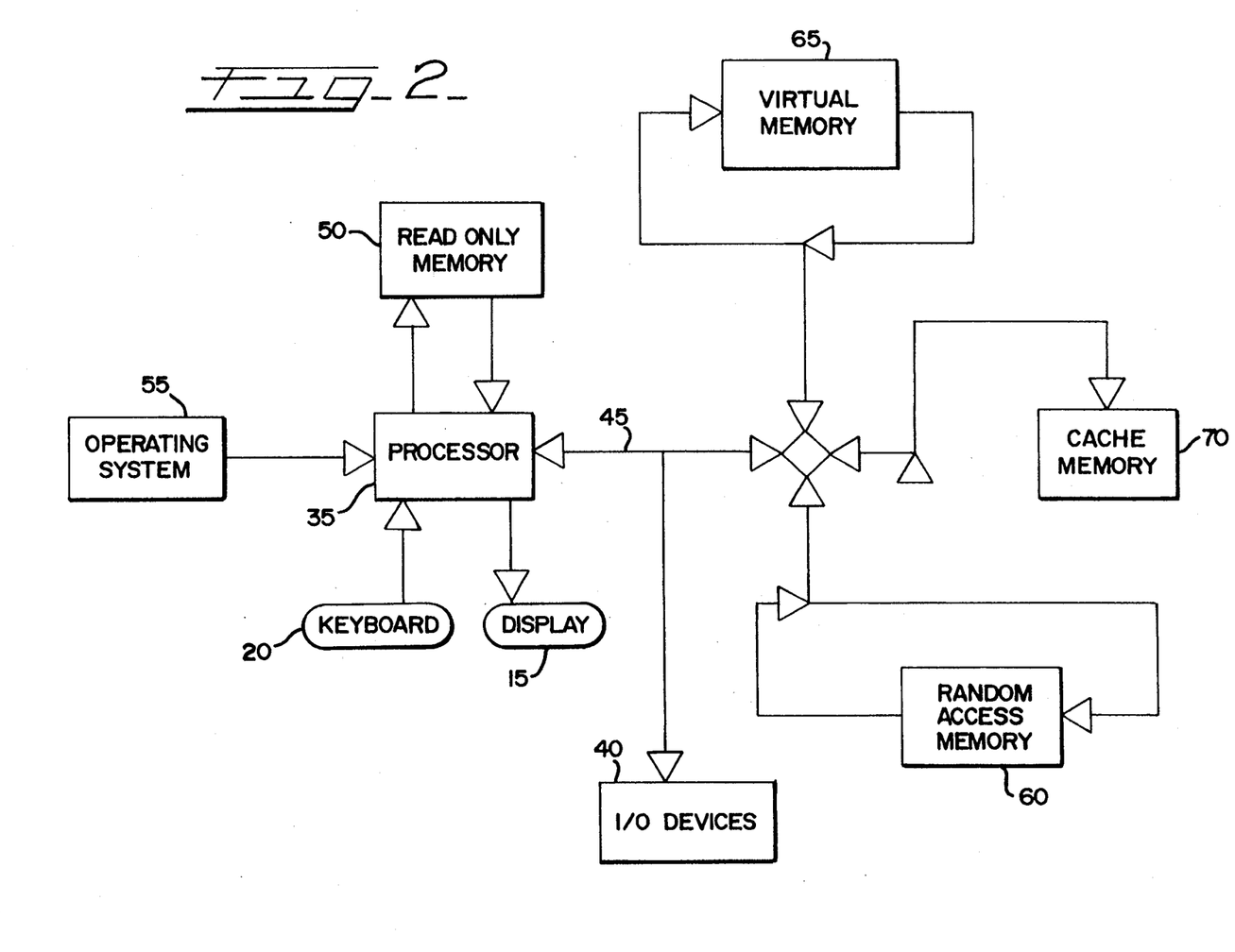
FIG. 2 is a functional block diagram illustrating the operation of the optically encoded memory system and its associated hardware.

FIG. 2 is a functional block diagram illustrating the operation of the optically encoded memory system and its associated hardware. In FIG. 2, the memory system includes a display 15, a keyboard 20, a main processor 35, a group input-output (I/O) device 40, a plurality of busses 45, a read-only memory (ROM) 50, an operating system 55, a random-access memory (RAM) 60, a virtual memory store 65, and a cache memory 70.

Upon the application of power, a computer system embodying the present invention initially assumes a "cold boot" or system-ready mode where the system parameters are initialized and the system is readied for entry or retrieval of computer information or both. During the system-ready mode, the user, in response to a system-ready prompt on the display 15, inputs a command via the key board 20 which activates the main processor 35. When it is activated, the main processor 35 polls all the input/output devices 40 via the I/O memory bus 45 for functions waiting to be performed by the system as defined in the ROM 50. The main processor 35, via the display 15, will then indicate a message if there is an error. If the main processor 35 finds an error, it will shut down and indicate through the display 15 that an error was found. If no error is present, the main processor 35 causes the display 15 to indicate a message "insert the card". At this point, the operator can insert an optically encoded card 31 into the laser optical card reader 30.

If the optical card 31 is inserted into and read by the laser optical card reader 30, the main processor 35 examines the information read from the optical card 31, searching for errors. If an error is found, the main processor 35 indicates an "invalid card" message on the display 15. If no error is found, and the optical card 31 is valid, the main processor 35 transfers the message "operating systems loading" to the display 15. The operating systems information contained on the optical card 31 is then transferred by the main processor 35 from the ROM 50 to the RAM 60. The main processor 35 is now operating under the control of the operating system 55 and will then poll all option peripherals on the busses 45 to check whether any functions have changed since the initial check. If changes have occurred, the changed functions are executed. The main processor 35 will then open the communication links to all option peripherals previously located and will transfer a message to the display 15 indicating that the system is loaded. At this point, all of the required operational computer information is stored in the memory of the computer system. Accordingly, the optical card 31 could be removed by the user and the system would remain operational.

Figure 3:
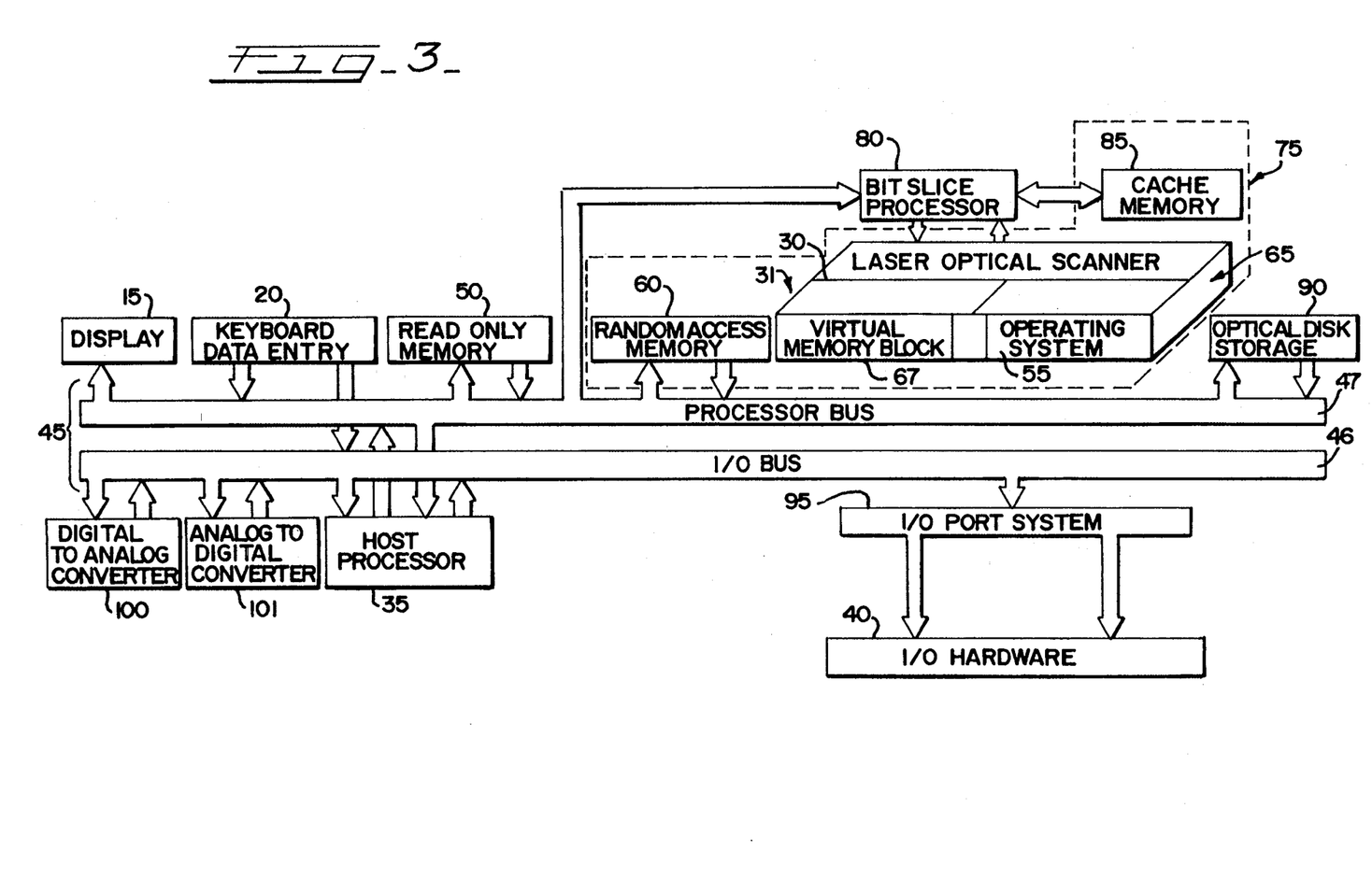
FIG. 3 is a detailed bus diagram illustrating the operating architecture of the optically encoded memory system.

FIG. 3 is a detailed bus diagram illustrating the operating architecture of the optically encoded memory system. As shown above, the system includes a virtual memory and an "on board" optical laser card memory system. Further, it can be seen that the busses 45 include an I/O bus 45 and a processor bus 47. The I/O bus 46 interconnects the key board 20 and the main processor 35 with an I/O port system 95 and associated I/O hardware 40, a digital-to-analog converter (D-A) 100 and an analog-to-digital converter (A-D) 101. The processor bus 47 interconnects the display 15, the keyboard 20 and the main processor 35 with the ROM 50, the operating system 55, the RAM 60 and an optical disk storage 90. A read-write memory 75 includes the laser optical card reader 30, the operating system 55 and the virtual memory store 65, embedded in the optical medium that is the card 31. It is this combination, under the control of the main processor 35 through the input/output bus 46 and the processor bus 47, that allows rapid access, transfer, and retrieval of computer information.

After the optically encoded memory system of the present invention has completed the "cold boot" mode or the system-ready mode as described above, the system is available to perform a variety of data manipulations. These manipulations are performed through the system illustrated in FIG. 3, and in particular, under the control of the main processor 35 through the read/write memory 75.

Figure 4:
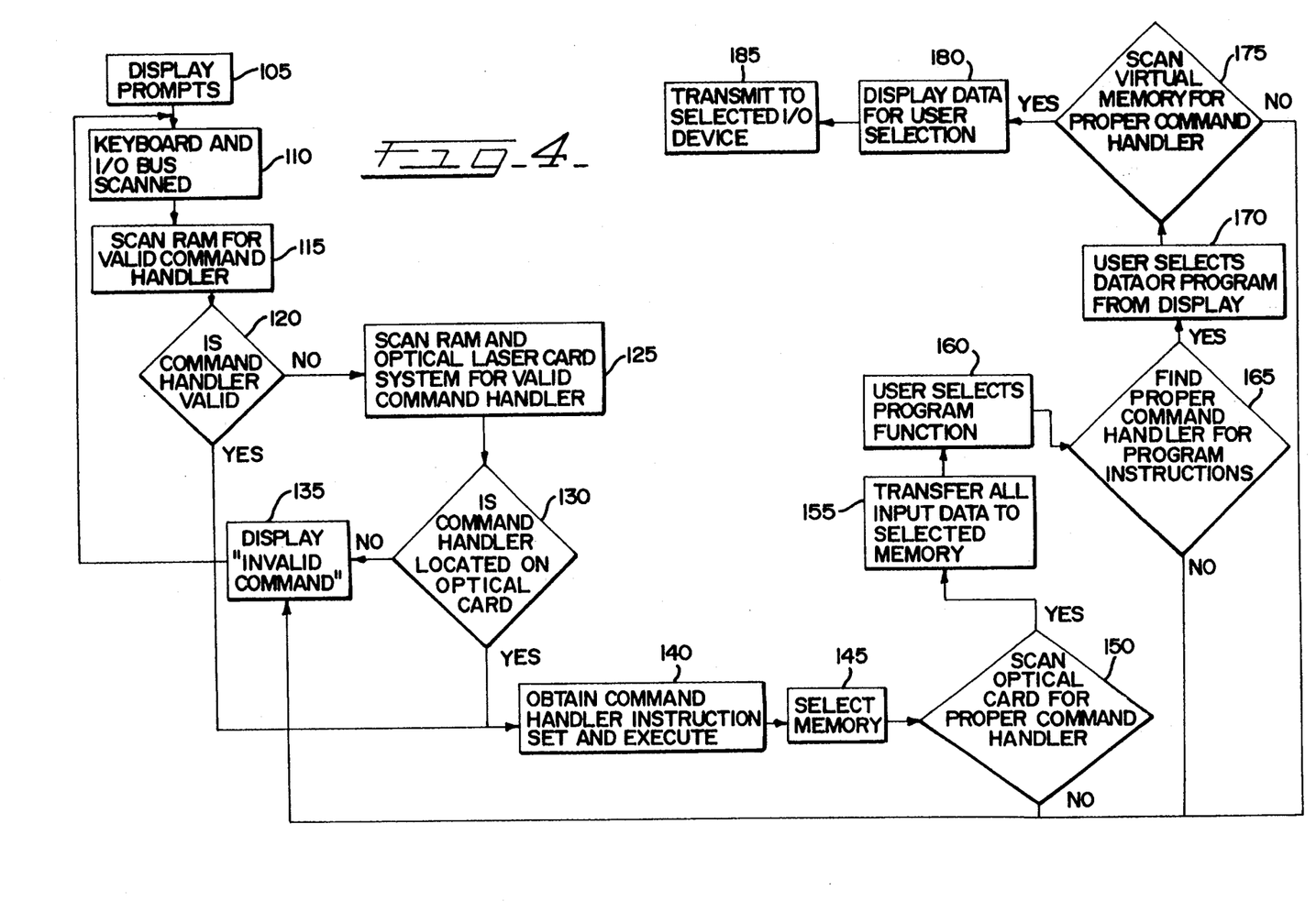
FIG. 4 is a functional flow chart of the detailed functional steps carried out by the optically encoded memory system.

FIG. 4 is a functional flow chart of the detailed functional steps carried out by the optically encoded memory system of FIG. 3. In FIGS. 3 and 4, the display 15 initially indicates in step 105 a user prompt for the user to select a particular operation or function. The main processor 35 examines in step 110 the keyboard 20, the I/O bus 46 and the processor bus 47 for user selected activities. The user will then input via the keyboard 20 the command of either yes or no for the particular operation desired. It should be noted that until the user enters a command through the keyboard 20, the system repeatedly scans the keyboard and system peripherals for activity. If the user command is yes, the processor 35 scans in step 115 an operating system command table in RAM 60 for a valid command handler. A system command handler as used here may be any type of function required by the configuration of the system. Such functions include but are not limited to Enter Date/Time, Display Disk Data, Request System Hibernation Mode, Request System Shutdown, and the like.

The main processor 35 then checks in step 120 to see if the command handler selected is valid. If it is invalid, the processor 35 will scan in step 125 the RAM 60 and then the optical card 31 through the optical laser card reader 30, a bit slice processor 80 and a cache memory 85 for the proper command handler. The main processor 35 then checks in step 130 through the optical laser card scanner 30 to see if the command handler selected is found on the optical card 31. If the command handler is not found on the optical card 31, the main processor 35 transfers the message "invalid command" to the display 15 at step 135, and returns to step 110 where the keyboard 20, the I/O bus 46 and the processor bus 47 are again scanned. If the request command handler is found on the optical card 31, the processor 35 obtains or retrieves the command handler instruction set from the cache memory 70, the ROM 50 or the optical card 31 via the bit slice processor 80, the cache memory 85, and the optical laser card reader 30. The system is now ready to execute the instruction set of the command handler in step 140.

Initially, the main processor 35 scans the command handler for the "Enter Data, Date/Time" mode. The main processor 35 then selects in step 145 which memory is to be used to store the user-selected calculations and data manipulations: the optical card read-write memory 75 via the bit slice processor 80, cache memory 85, optical laser card reader 30 and associated optical card 31; the optical disk storage 90; or the RAM 60. The main processor 35 then scans in step 150 the optical card 31 via the optical laser card reader 30, the bit slice processor 80, the cache memory 85 and the virtual memory store 65 for the proper command handler in use. If the command handler found is invalid, the main processor 35 causes the display 15 to indicate "invalid command" at step 135 and control returns to step 110, where the keyboard 20, I/O bus 46 and the processor bus 47 are again scanned. If the proper command handler is found, the main processor 35 transfers all the entered computer information from the keyboard 20 into the desired memory device such as the RAM 60, the read-write memory 75 or the optical disk storage 90 in step 155. If RAM 60 or optical read-write memory 75 is chosen, the user may then manipulate the data in the RAM 60 and may further place the data into permanent storage, such as on the optical disk storage 90, by selecting the "enter date" command and choosing the appropriate memory device.

If the user desires to manipulate or store the date permanently, the "call directory" or "directory of programs" function is selected at step 160. During this portion of operation of the optically encoded memory system, the main processor 35 scans the optical card 31 via the optical card reader 30, the bit slice processor 80, the cache memory 85, and the virtual memory store 65 for the proper command handler for program instructions in step 165. If the command handler program instruction found is not correct, the main processor 35 will cause the display 15 to indicate "invalid command" in step 135. If the command handler found is proper, the processor transfers the "directory of data" or data block information from the optical card 31 via the optical laser card reader 30, the cache memory 85, and the bit slice processor 80 to the display 15. The user may then select from the "directory of data or programs" on the display 15 and instruct the processor 35 via the keyboard 20 to place the selected data into the RAM 60 for further user manipulation or storage in step 170. For example, if the user selects the Enter Date/Time command handler, the user enters the date and time via the keyboard 20. Under control of the main processor 35, through the I/O bus 46, the processor bus 47, the bit slice processor 80, the cache memory 85 and the optical laser card reader 30, the entered date and time will then be encoded or written onto the optical card 31.

After the user selects the data or program from the display 15, the main processor 35 causes the virtual memory store 65 via the bit slice processor 80 to be scanned for the proper command handler in step 175. If the command handler found is incorrect, the main processor 35 causes the display 15 to indicate "invalid command" at step 135, and it returns to functional step 110 where the keyboard 20, the I/O bus 46 and the processor bus 47 are again scanned. If the proper command handler found is correct, the main processor 35 then causes the data portion of the virtual memory store 65, the optical disk storage 90 and other associated memory storage devices, to be scanned for the required data. The main processor 35 then transfers the data to the display 15 for selection by the user in step 180. The user then selects the I/O device 40 desired via the I/O Port system 95. The main processor 35 scans the input commands via the keyboard 20, the I/O bus 46 and the processor bus 47, and it configures the system in step 185 to receive or transmit the data using D-A converter 100 or A-D convertor 101, as required by the particular I/O device 40 selected.

If the user selects the "systems hibernation mode" the main processor 35 will then reduce power consumption for the entire system by scanning only the I/O bus 46 until the user either inputs a command via the keyboard 20 or else elects to shut down the system.

Figure 5:
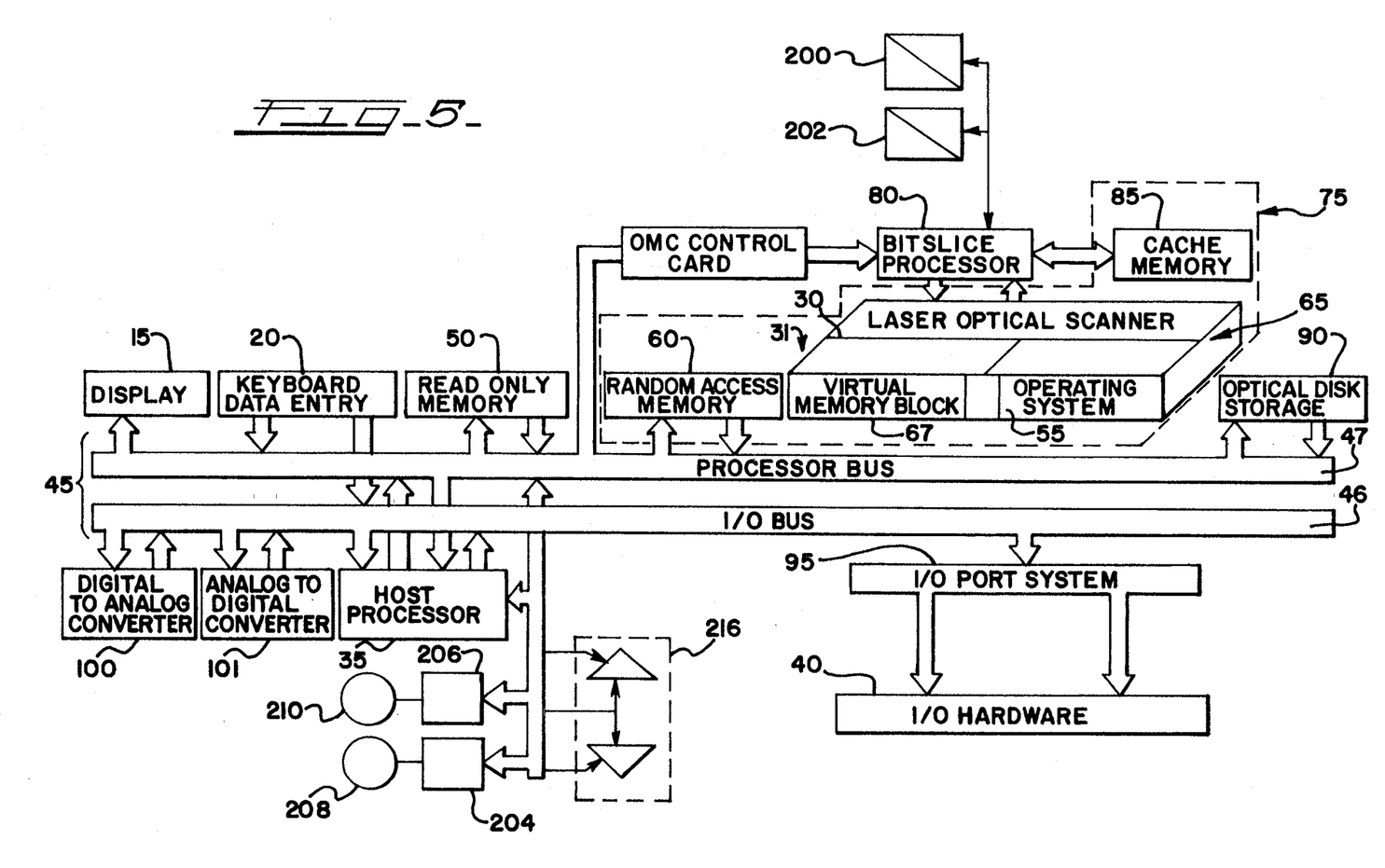
FIG. 5 is a functional block diagram of the system of FIG. 3 that is particularly adapted for the use of rotating optical storage media.

FIG. 5 is a functional block diagram of an apparatus for the practice of the present invention that is particularly adapted for the use of rotating optical storage media. In FIG. 5 busses 45 comprise the I/O bus 46 and the processor bus 47. The main processor 35 is connected to the I/O bus 46 and the processor bus 47. The display 15 is connected to receive information from the processor bus 47 and the ASCII keyboard 20 is connected to supply information both to the processor bus 47 and the I/O bus 46. The ROM 50 receives information from and delivers information to the processor bus 47. The I/O bus 46 supplies digital information to the D-A converter 100 and receives information from the A-D converter 101. The I/O bus 46 is connected through the I/O port system 95 to I/O devices 40. These elements and component numbers are common to FIG. 3, as is the bit slice processor 80, which is connected to receive information from the processor bus 47 through an optical memory controller 198. The bit slice processor 80 may be connected to the card reader 30 to comprise those components that constitute the virtual memory store 65 under the control of the operating system 55, or it may be connected to a plurality of read-write (R/W) heads 200 and 202. Only two such R/W heads 200 and 202 are shown here, but it should be understood that a plurality of such heads can be arranged to address a rotating optical medium. This provides rapid access to the rotating optical medium to read and write data in less time than may be taken to read data from or write data to the extremities of a flat card. The R/W heads 200 and 202 are connected through the bit slice processor 80 to a plurality of parallel processors 204 and 206. Again, only two parallel processors 204 and 206 are shown in FIG. 5, but it is possible to connect additional parallel processors to the bit slice processor 80 to speed access to the data contained in a RAM 208 which is connected to the parallel processor 204 and a RAM 210 that is connected to the parallel processor 206. The processor bus 47 is also connected to a multi-ported RAM 216.

Figure 6:
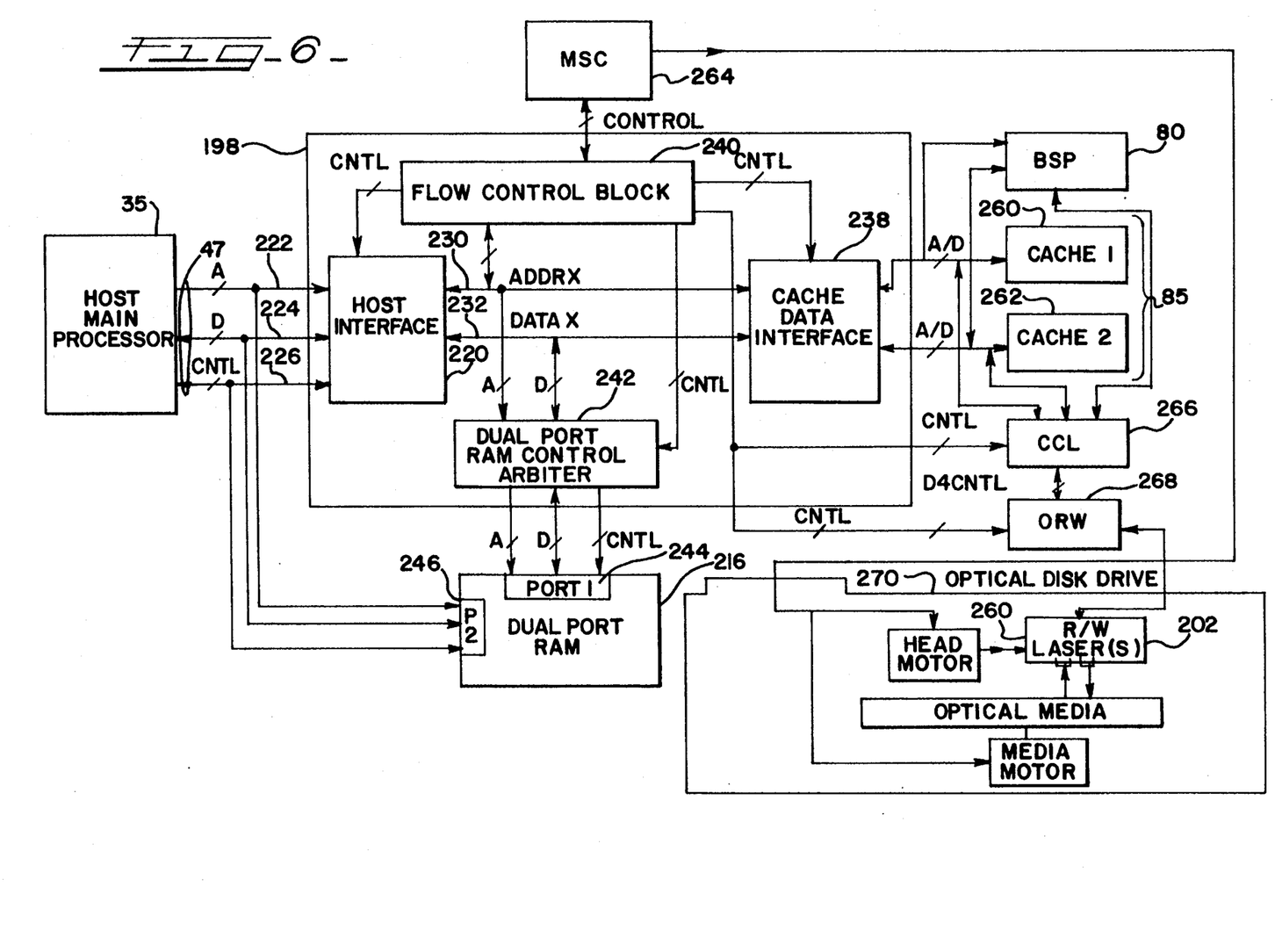
FIG. 6 is a structural diagram of the system of FIG. 3 including details of the optical memory controller 198 of FIG. 5 as configured for use with a single host processor.

FIG. 6 is a structural diagram of system of FIG. 3 including details of the optical memory controller 198 of FIG. 5 as configured for use with a single host processor. In FIG. 6, the host or main processor 35 is connected through the processor bus 46 to the dual-ported RAM 216 and also to the optical memory controller 198, which comprises a host interface 220 that is connected to the processor bus 47. The processor bus 47 is here split to show an address line 222, a data line 224, and a control line 226, all connected to the host interface 220. The address line 222 and the data line 224 are two-way lines, carrying data to and from the main processor 35, while the control line 226 brings control only to the host interface 220.

An address line 230 and a data line 232 are connected to a cache data interface 238, a flow control block 240 and an arbiter 242 that is connected to a port 244 of the dual-port RAM 216. A second port 246 of the dual-port RAM 216 is connected to the processor bus 47. The host interface 220, the cache data interface 238, the flow controller 240, and the arbiter 242 are all parts of the optical memory controller 198. The cache data interface 238 is connected to the bit slice controller 80 and to a cache 260 and a cache 262 which together comprise the cache 85 of FIG. 5. The flow controller 240 supplies a control signal to the host interface 220, the cache interface 238, and the arbiter 242. The flow controller 240 is also connected to a mechanical servo controller 264, a cache controller 266, and an optical read-write controller 268, all by control signal lines. The cache controller 266 also supplies control to the bit slice processor 80, as well as supplying both control and data to the optical read-write controller 268. The mechanical servo controller 264 controls an optical disc drive 270, which in turn controls the read-write head assemblies 200 and 202. Only two read-write head assemblies 200 and 202 are shown here, but it should be understood that a larger number may be used, and that the increase beyond one such head assembly increases the speed of access to data on the optical medium because it is no longer necessary to wait for the time needed to go to an end of a linear storage card or to make a full rotation of a rotating storage medium. The result is to make the information accessed by the read-write heads 200 and 202 appear to a user of the computer system as virtual memory, or in other words to appear as though it were an increased amount of available RAM.

Figure 7:
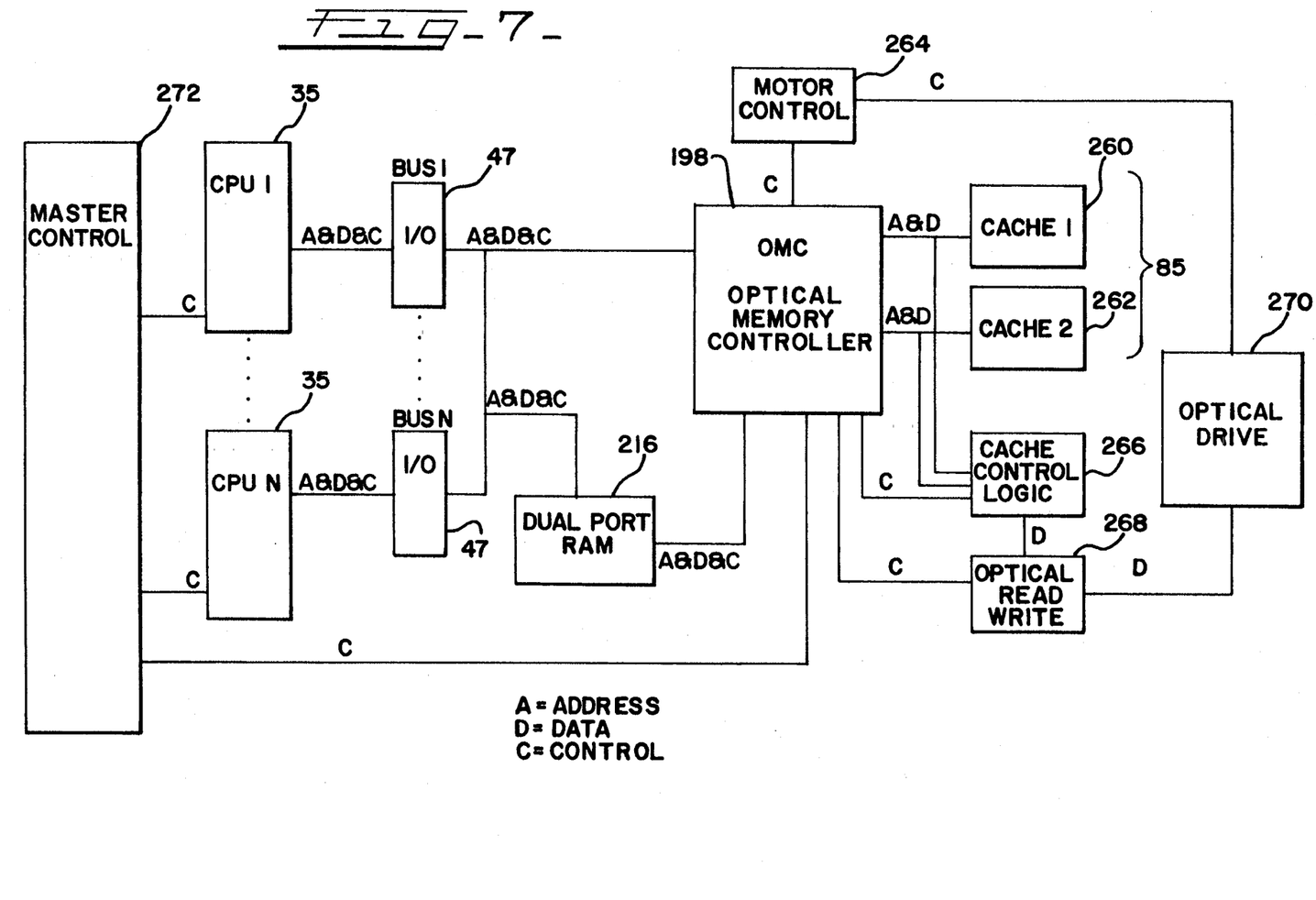
FIG. 7 is a structural diagram of the system of FIG. 3 as configured for use with multiple host processors.

FIG. 7 is a structural diagram of the system of FIG. 3 including details of the optical memory controller 198 of FIG. 5 as configured for use with multiple host processors. In FIG. 7, a plurality of host or main processors 35 are connected each through its own processor bus 46 to the multi-ported RAM 216 and also to the optical memory controller 198, which is identical to that of FIG. 6 and hence is not shown in detail. The host processors 35 are controlled by a master controller 272, which supplies operational and timing control to the host processors 35. The cache 260 and the cache 262 together comprise the cache 85 of FIG. 5 as before, and the optical memory controller 198 is connected to the mechanical servo controller 264, the cache controller 266, and the optical read-write controller 268, all by control signal lines. The mechanical servo controller 264 controls the optical disc drive 270, which is identical to that shown in FIG. 6. The result of the operation of the optical disk drive 270 is to make the information accessed by it appear to a user of the computer system as virtual memory, or in other words to appear as though it were an increased amount of available RAM.

Figure 8:
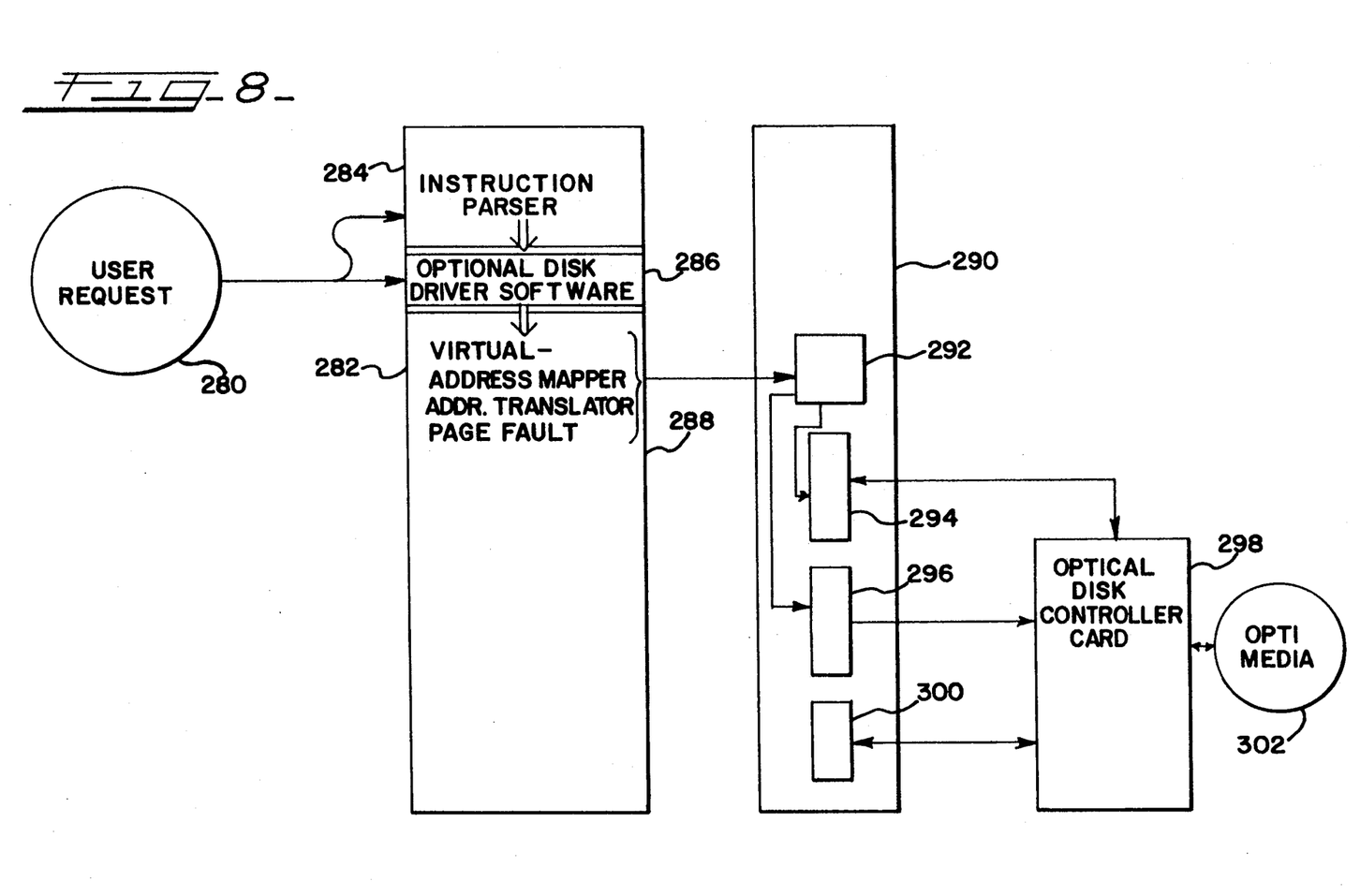
FIG. 8 is a functional block diagram of the flow of control of a rotating optical storage medium with cascaded read-write heads that are controlled by a single processor.

FIG. 8 is a functional block diagram of the control of a rotating optical storage medium with cascaded read-write heads that are controlled by a single processor. In FIG. 8, which describes the operation of both the single-processor unit of FIG. 6 and the multiple-processor unit of FIG. 7, a user request 280 is taken to host software 282, in which an instruction parser 284 controls optical disk driver software 286. This in turn controls a virtual address mapper and page translator 288, which controls host hardware 290. The host hardware 290 includes virtual control registers 292, which are controlled by the mapper and translator 288 and which are connected to a bus control 294 and an address register 296. Both the bus control 294 and the address register 296 are connected to and provide control to an optical disk controller card 298. A read-write register 300 which is a part of the host hardware 290 is connected through the optical disk controller card 298 to send data to and receive data from an optical medium 302 under the control of the optical disk controller card 298.

Figure 9:
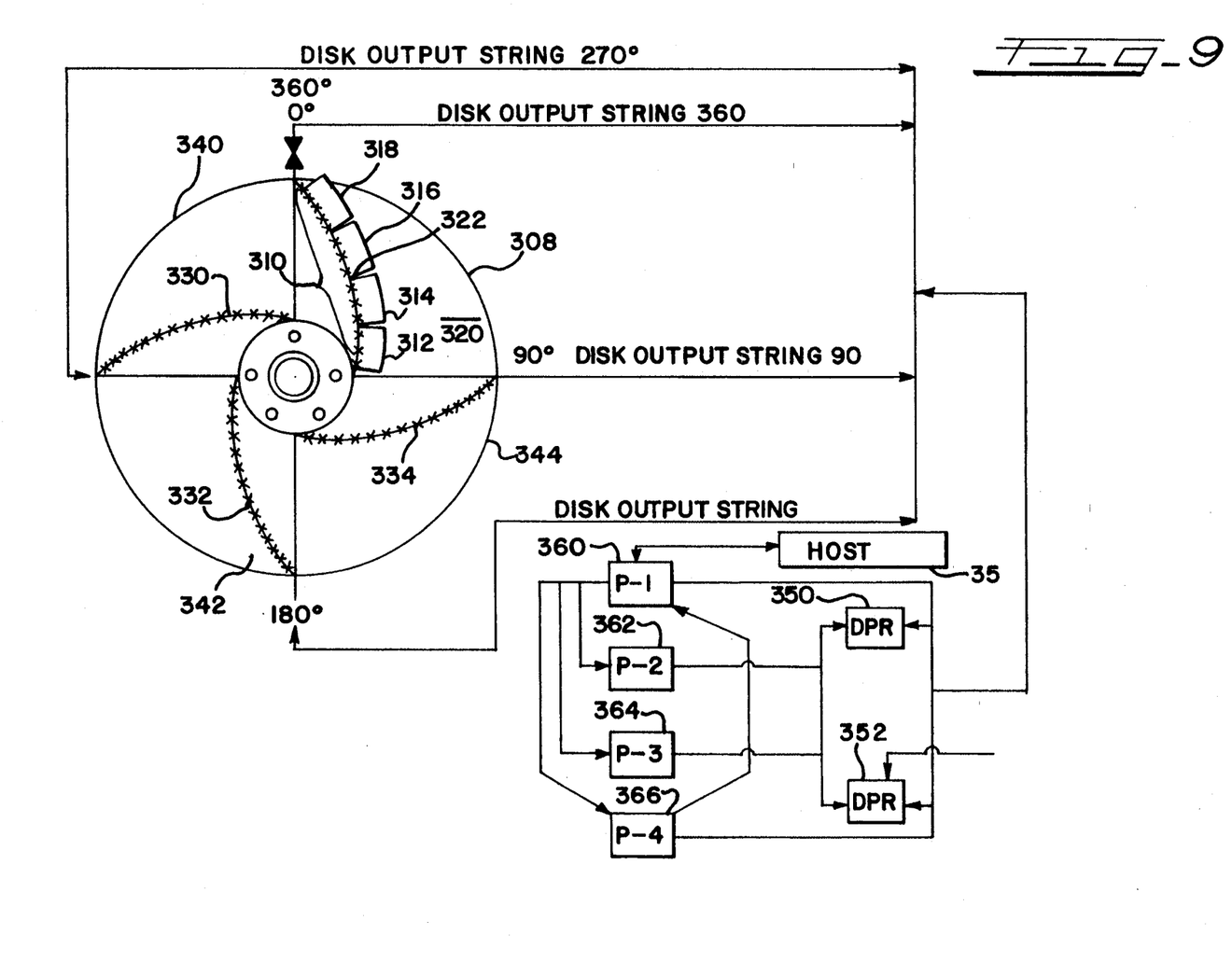
FIG. 9 is a view of a rotating optical disc showing the placement of four sets of read-write heads and a circuit arrangement for the processing of information written by and read by those heads.

FIG. 9 is a view of a rotating optical disc showing the placement of four sets of read-write heads and a circuit arrangement for the processing of information written by and read by those heads. In FIG. 9, a rotating optical disc 308 has a set 310 of physically cascaded read-write heads 312, 314, 316, and 318 disposed in a first quadrant 320 of the optical disc 308. The heads 312, 314, 316, and 318 are arranged in a spiral 322 that extends radially on the optical disc 308. Only four read-write heads 312–318 are shown here, but it should be evident that a number is chosen to cover the number of tracks on the optical disc 308. Similar arrangements of sets 330, 332, and 334 are disposed in the second quadrant 340, the third quadrant 342, and the fourth quadrant 344 respectively. Because there are four sets of heads, the access time to data on the rotating optical disc 308 is at most one-quarter of a revolution of the disc 308. The number of sets of read-write heads is limited only by the available space, and the access time thus varies as the reciprocal of the number of sets of heads. Data to and from all of the heads passes through one or more multi-ported RAMs such as dual-ported RAMs 350 and 352, through an appropriate number of parallel processors 360, 362, 364, and 366 to the host processor 35.

The result of the combination of hardware and software described above is a system in which a single host processor controls the operations of a conventional computer system and also controls a number of processors whose function is to read data from and write data to various optical media that are operating in a virtual-memory mode. Only two such processors have been shown for convenience and clarity of the description, but it should be evident that N such processors can be used, with the number N limited only by the ability of the controller to control them all. Within the limits of that control, the greater the number of paralleled controllers, the faster the virtual memory is available for use. The system is also adaptable for use with a single host processor that operates the computer system and a number of co-processors, each of which stands alone to read data from and write data to a rotating optical storage medium which thus appears as a portion of the virtual memory of the overall system. Accordingly, the optically encoded memory system of the present invention provides the ability to couple a very high density data medium with a variety of multiple processor computer architectures to negate any disparity in data search time and thereby allow rapid access, retrieval, transfer, and storage of computer information. In addition, the combination of a very high density data medium with a rotating laser optical scanner in an extremely compact and portable package provides large-scale computer performance in computer architectures of small to moderate sizes. This large-scale performance is provided by the rotating optically encoded memory system of the present invention in a cost-efficient manner. Further, the rotating optically encoded memory system is adaptable to currently available computer architectures.

From the foregoing, it will be appreciated that many variations and modifications may be made without departing from the spirit and scope of the novel concepts of the subject invention. It is to be understood that no limitation with respect to the specific apparatus illustrated here is intended or should be inferred.

What is claimed is:

1. An apparatus for use with a system, operated by a user, and having discrete memory storage block and rotating optical medium storage blocks, which stores computer information on and retrieves computer information from the rotating optical medium and the discrete memory storage, said apparatus comprising:

means for scanning to access the computer information from the rotating optical medium, said means for scanning being a plurality of optical read-write heads;

virtual memory store means for storing the computer information in one of the rotating optical medium storage blocks and the discrete memory storage block;

means for accessing and directly transferring the computer information to and from at least one of the plurality of optical read-write heads and the discrete memory storage, such that the logical configuration for the storage of computer information in said discrete memory storage block is extended to include memory locations in said rotating optical medium storage blocks; and means for processing the computer information, the means for processing in communication with the means for scanning and the discrete memory storage, the means for processing being connected to the discrete memory storage for transferring computer information from the means for scanning to the virtual memory store means in response to instructions from the discrete memory storage.

2. The apparatus of claim 1 comprising in addition a bus for rapidly transferring the computer information to and from at least one of the plurality of optical read-write heads, the means for processing and the discrete memory storage.

3. The apparatus of claim 1 comprising in addition means for displaying computer information.

4. The apparatus of claim 1 wherein the means for processing is connected to the discrete memory storage for transferring computer information from the means for scanning to the virtual memory store in response to instructions from the discrete memory storage.

5. The apparatus for claim 1 comprising in addition means for entering data into said accessing and transferring means.

6. The apparatus of claim 1 wherein said means for accessing and directly transferring comprises an input/output bus system and a processor bus system for rapid and efficient transfer of said computer information.

7. The apparatus of claim 6 wherein the means for processing transfers computer information from at least one of a means for entering data and the means for scanning via at least one of the input/output bus systems and the processor bus system to at least one of the virtual memory store means and the discrete memory storage thereby increasing rapid availability of the computer information to the host processor bus.

8. The apparatus of claims 1 wherein the computer information comprises at least one of data and program instructions.

9. A method of extending the capacity of discrete hardware memory storage in a computer system having a bus, the method comprising the steps of:

scanning a rotating optically encoded medium for computer information through the use of the one of a plurality of optical read-write head assemblies which is located closest to said computer information on said rotating optically encoded medium;

retrieving the computer information from at least one of the plurality of optical read-write head assemblies and the rotating optically encoded medium;

selectively and directly transferring the retrieved computer information to a virtual memory store means for storing computer information;

scanning the discrete memory storage for an operating system command corresponding to the user input command;

scanning one of the discrete memory storage and the rotating optically encoded medium for handling instructions corresponding to the operating system command;

retrieving the corresponding handling instruction; and selectively and directly transferring the computer information as directed by the retrieved handling instruction to at least one of the discrete hardware memory storage and the rotating optically encoded medium through use of the virtual memory store means, thereby carrying out the user input command.

10. A method of extending the capacity of discrete hardware memory storage in a computer system having a bus, the method comprising the steps of:

scanning a rotating optically encoded medium for computer information through the use of one of a plurality of optical read-write head assemblies;

retrieving the computer information from at least one of the plurality of optical read-write head assemblies and the rotating optically encoded medium;

selectively and directly transferring the retrieved computer information to a virtual memory store means for storing computer information;

scanning the discrete memory storage for an operating system command corresponding to the user input command;

scanning the rotating optically encoded medium for handling instructions corresponding to the operating system command;

retrieving the corresponding handling instruction; and selectively and directly transferring the computer information, as directed by the retrieved command handler, to at least one of a random access memory and the rotating optically encoded medium through the use of a cache memory and a bit slice processor.

* * * * *